(12) United States Patent
Cheng et al.

(10) Patent No.: US 6,418,130 B1
(45) Date of Patent: Jul. 9, 2002

(54) REUSE OF SECURITY ASSOCIATIONS FOR IMPROVING HAND-OVER PERFORMANCE

(75) Inventors: Yi Cheng, Solna; Lars Björup, Stockholm; Martin Jakob Rinman, Täby; Karl Dan Gustav Jerrestam, Johanneshov, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/234,512

(22) Filed: Jan. 21, 1999

Related U.S. Application Data (60) Provisional application No. 60/115,349, filed on Jan. 8, 1999.

(51) Int. Cl.[7] .............................................. H04M 1/66
(52) U.S. Cl. ..................... 370/331; 455/411; 455/410; 370/328; 370/338; 380/247
(58) Field of Search ................................ 370/328, 338, 370/331; 455/410, 411; 380/247

(56) References Cited

U.S. PATENT DOCUMENTS

| | | |
|---|---|---|
| 5,081,679 A | 1/1992 | Dent |
| 5,243,653 A | 9/1993 | Malek et al. |
| 5,293,423 A | 3/1994 | Dahlin et al. |
| 5,444,766 A * | 8/1995 | Farwell et al. .............. 455/437 |
| 5,546,464 A | 8/1996 | Raith et al. |
| 5,778,075 A * | 7/1998 | Haartsen ..................... 375/138 |
| 6,253,321 B1 * | 6/2001 | Nikander et al. ........... 713/160 |

FOREIGN PATENT DOCUMENTS

| WO | WO 0139538 | * | 5/2001 | ............ H04Q/7/38 |

* cited by examiner

*Primary Examiner*—Hassan Kizou
*Assistant Examiner*—Tim Spafford
(74) *Attorney, Agent, or Firm*—Burns, Doane, Swecker & Mathis, L.L.P.

(57) ABSTRACT

In a radio telecommunication system, the performance of a mobile unit can be significantly improved during a hand-over procedure by reusing existing security associations that correspond to the mobile unit. By reusing existing security associations, a mobile unit can begin secure communications immediately following the hand-over. Otherwise, and in accordance with conventional practice, the mobile unit will have to undertake the time consuming task of renegotiating the required security associations, before it can begin transmitting and receiving secure communications.

35 Claims, 5 Drawing Sheets

REUSE OF SECURITY ASSOCIATIONS FOR IMPROVING HAND-OVER PERFORMANCE

This application claims priority under 35 U.S.C. §§119 and/or 365 to U.S. Provisional Application No. 60/115,349 filed in the United States on Jan. 8, 1999; the entire content of which is hereby incorporated by reference.

FIELD OF THE INVENTION

The present invention involves wireless telecommunication systems and/or networks, such as wireless local are a networks (LANs) and Mobile Internet Protocol (IP) systems. More particularly, the present invention involves the reuse of security associations when a mobile unit or mobile terminal undergoes handover from one stationary unit in the network to another.

BACKGROUND

With the rapid development of wireless and mobile communication technologies, communication security issues, such as user authentication, traffic privacy and message integrity have become important concerns. In response, a number of Internet Engineering Task Force (IETF) security protocol standards, such as the Internet Key Exchange (IKE) protocol, the Internet Security Association and Key Management Protocol (ISAKMP), and the Internet Protocol Security ($IP_{SEC}$), are now employed in various wireless LAN and Mobile IP environments.

The IKE protocol was designed to provide a mechanism for two or more communicating parties, such as a mobile unit (MU) and a network stationary unit (SU), to negotiate various security services and security associations. A security service is a method or means for providing protection for the communication between the two or more parties, whereas, a security association (SA) is a relationship between the two or more communicating parties which defines how the parties will execute the agreed upon security services. A security association is actually defined by a set of attributes, such as an authentication algorithm, an authentication key, an encryption algorithm, an encryption key, and a SA lifetime, which represents the period of time during which the corresponding SA is valid. As one skilled in the art will appreciate, the SAs must be negotiated and in place before the two or more parties can begin secure communications the procedure for negotiating security services and SAs in accordance with the IKE protocol is accomplished in two phases. In a first phase (i.e., phase 1), the communicating parties negotiate the ISAKMP SA. The ISAKMP SA is defined by a set of basic security attributes which provide protection for subsequent ISAKMP exchanges. In a second phase (i.e., phase 2), and under the protection of the ISAKMP SA, the communicating parties negotiate the $IP_{SEC}$ SAs associated with the $IP_{SEC}$ authentication header (AH) protocol and/or the $IP_{SEC}$ encapsulating security payload (ESP) protocol. The $IP_{SEC}$ protocols provide security services for communications at the IP layer. As is known in the art, a specific $IP_{SEC}$ SA is uniquely defined by a security parameter index (SPI), a destination IP address, and an $IP_{SEC}$ protocol (i.e., AH or ESP).

Because the SAs (i.e., the ISAKMP SA and the $IP_{SEC}$ SAs) are bound to the negotiating parties, the SAs are renegotiated whenever a mobile unit moves from one access point to another in a wireless LAN environment, or from one foreign agent to another in a mobile IP context. However, the IKE negotiation process is computationally intensive, particularly phase 1. This is especially troublesome in wireless LAN and mobile IP applications where the mobile unit is frequently undergoing hand-over from one SU to another and where the MU has limited computational power. Under such conditions, overall system performance will be exceptionally low since a significant amount of time must be spent renegotiating SAs rather than communicating.

SUMMARY OF THE INVENTION

It is an object of the present invention to provide a technique which improves the performance of a mobile unit (MU) in a wireless LAN or mobile IP environment, particularly during hand-over. The present invention accomplishes this by reusing rather then renegotiating the security associations (SAs) corresponding to the MU once the MU is handed-over. By reusing the SAs, less time is spent negotiating SAs. Consequently, a MU can begin secure communications almost immediately upon being handed-over from one SU to a another SU.

Accordingly, it is an objective of the present invention to provide a more efficient way to utilize SAs during hand-over.

It is another objective of the present invention to reduce and/or minimize the latency period between the time a MU is handed-over to a stationary unit and the time the MU can begin secure communications with that stationary unit.

It is yet another objective of the present invention to generally improve the performance of a MU through seamless hand-over.

It is still another objective of the present invention to maintain a required level of performance without sacrificing communication security.

In accordance with one embodiment of the present invention, the above-identified and other objectives are achieved through a method and/or an apparatus for accomplishing hand-over of a mobile unit from a first stationary unit to a second stationary unit. The method involves disconnecting the mobile unit from the first stationary unit, and thereafter, connecting the mobile unit to the second stationary unit. The method also involves reusing an existing security association to support the connection between the mobile unit and the second stationary unit, wherein the existing security association was previously used to support the connection between the mobile unit and the first stationary unit.

In accordance with another embodiment of the present invention, the above-identified and other objectives are achieved with a method and/or an apparatus for accomplishing hand-over of a mobile unit from a first stationary unit to a second stationary unit. More specifically, the method involves disconnecting the mobile unit from the first stationary unit, and thereafter, connecting the mobile unit to the second stationary unit. The method then involves reusing an existing security association to support the connection between the mobile unit and the second stationary unit, wherein the existing security association was previously used to ensure secure communications for a connection between the mobile unit and a third stationary unit, and wherein the third stationary unit and the second stationary unit are associated with a first administrative domain that employs a common security policy.

In accordance with still another embodiment of the present invention, the above-identified and other objectives are achieved with a method for reusing security associations to facilitate hand-over of a mobile unit between stationary units that are associated with a common administrative domain, wherein all of the stationary units associated with the common administrative domain are subject to the same security policy. The method involves negotiating a first security association for a connection between the mobile unit and a first stationary unit associated with the common administrative domain. The mobile unit is then disconnected from the first stationary unit, and thereafter, connected to a second stationary unit associated with the common administrative domain. A first set of security association attributes, corresponding to the first security association, is then transferred from the first stationary unit to the second stationary unit. The first security association can then be employed to ensure secure communications for the connection between the mobile unit and the second stationary unit.

BRIEF DESCRIPTION OF THE DRAWINGS

The objects and advantages of the invention will be understood by reading the following detailed description in conjunction with the drawings in which.

DETAILED DESCRIPTION OF THE INVENTION

For a better understanding of the invention, the following detailed description refers to the accompanying drawings, wherein preferred exemplary embodiments of the present invention are illustrated and described. In addition, the reference numbers used to identify key elements of the invention in the drawings are consistent throughout this description.

The present invention involves a technique which improves the performance of a mobile unit or mobile terminal (herein referred to as a "MU") in a radio telecommunication system, particularly during hand-over, wherein the MU becomes disconnected from a first stationary unit (herein referred to as "$SUk_k$") and connected to another stationary unit (herein referred to as "$SU_{k+l}$") and wherein $SU_k$ and $SU_{k+1}$ belong to a common administrative network domain that is under the control of a common security policy. The present invention accomplishes this by reusing one or more previously established security associations to support the newly formed connection between the MU and $SU_{k+1}$. By reusing these previously established security associations, the MU and $SU_{k+1}$ need not go through the time consuming task of renegotiating the security associations (herein referred to as "SA"s) each time the MU changes it's point of connection (e.g., undergoes hand-over) within the administrative domain. The present invention is of particularly importance where the communicating entities (e.g., the MU and $SU_{k+1}$) exhibit low to medium level computational power, and where the MU is especially mobile and frequently undergoing hand-over.

In accordance with the present invention, each of a number of stationary units (SUs) associated with the same administrative domain, and thus under the control of a common security policy, are managed in an identical manner with respect to the SAs that are employed to protect the communication between the MU and the various SUs. Accordingly, the set of SAs that are established between the MU and any one of the various SUs belonging to that administrative domain can be reused by any one of the other SUs associated with that administrative domain, if and when the MU is handed-over to one of these other SUs. As previously stated, reuse of the previously established SAs will improve the performance of the MU during hand-over, without sacrificing communication security. However, depending upon the extent to which MU performance improvement is desired, two exemplary embodiments of the present invention are described herein below.

In accordance with a first exemplary embodiment of the present invention, herein referred to as the partial SA reuse embodiment, a previously established Internet Security Association and Key Management Protocol (ISAKMP) SA is reused each time the MU is handed-over to another SU (i.e., $SU_{k+1}$) in the administrative domain. More specifically, when the MU establishes a connection with a SU in the administrative domain for the first time, the Internet Key Exchange (IKE) phase 1 negotiation, which is used for establishing the ISAKMP SA, and the IKE phase 2 negotiation, which is used for establishing the $IP_{SEC}$ SAs, are carried out in accordance with the various standards set forth by the Internet Engineering Task Force (IETF). However, as the mobile unit moves about, and is handed-over to another SU (i.e., $SU_{k+1}$) associated with the same administrative domain, the previously established ISAKMP SA is reused by the MU and $SU_{k+1}$. Nevertheless, the MU and $SU_{k+1}$ still must conduct an IKE phase 2 negotiation; that is, the MU and $SU_{k+l}$ must renegotiate the $IP_{SEC}$ SAs. Because the IKE phase 1 SA negotiation process is far more time consuming relative to the IKE phase 2 negotiation process, the reuse of the ISAKMP SA greatly improves the performance of the MU during hand-over.

In accordance with a second exemplary embodiment of the present invention, herein referred to as the full SA reuse embodiment, the previously established ISAKMP SA and the previously established $IP_{SEC}$ SAs are reused each time the MU undergoes hand-over from one SU (i.e., $SU_k$) to another SU (i.e., $SU_{k+1}$) in the administrative domain. As stated above, when a MU connects with a SU in the administrative domain for the first time, the ISAKMP SA and the $IP_{SEC}$ SAs are established in accordance with the IKE phase 1 and the IKE phase 2 negotiation processes respectively. However, unlike the partial SA reuse embodiment described above, subsequent hand-overs result in the reuse of both the previously established ISAKMP SA and the previously established $IP_{SEC}$ SAs. Thus, the entire IKE SA negotiation process, including phase 1 and phase 2, is avoided. Therefore, the MU and $SU_{k+1}$ can begin communicating with each other almost immediately after the ISAKMP SA and the $IP_{SEC}$ SAs are transferred from $SU_k$ to $SU_{k+1}$. Consequently, the hand-over procedure is accomplished in a seamless or near seamless fashion.

In general, the full SA reuse embodiment provides greater MU performance enhancement during hand-over than does the partial SA reuse embodiment. That is because the MU and $SU_{k+1}$ need not renegotiate any SAs. Why then might a network administrator opt to implement the partial SA reuse embodiment over the full SA reuse embodiment? One reason might be that the network administrator does not want the various SUs associated with an administrative domain to share the same session keys (i.e., encryption and authentication keys) as specified by the $IP_{SEC}$ SAs. If, for example, all the SUs associated with the administrative domain share the same session keys and just one of the SUs is compromised, an attacker can probably compromise communications between the MU and any of the SUs associated with the administrative domain.

As stated previously, a specific $IP_{SEC}$ SA is uniquely identified by a security parameter index (SPI), in combination with a destination IP address, and a particular security protocol (e.g., the authentication header protocol or the encapsulating security payload protocol). As such, a common IP address is needed for all SUs in the administrative domain, in order to reuse an $IP_{SEC}$ SA. In accordance with the full SA reuse embodiment, this common IP address may be assigned to each SU as an alias IP address. However, under certain circumstances, a network administrator may not want to assign a common IP address to each SU. If this is the case, the network administrator is likely to opt the partial SA reuse embodiment rather than the full SA reuse embodiment.

When a MU is handed-over from one SU (e.g. $SU_k$) to another SU (e.g. $SU_{k+1}$), the SA attributes corresponding to the ISAKMP SA and the SA attributes corresponding to the $IP_{SEC}$ SAs, depending upon whether the partial SA reuse embodiment or the full SA reuse embodiment is being employed, must be transferred from $SU_k$ to $SU_{k+1}$. This transfer of SA attributes from $SU_k$ to $SU_{k+1}$ may be accomplished in accordance with any one of a number of exemplary techniques.

Figure 1:
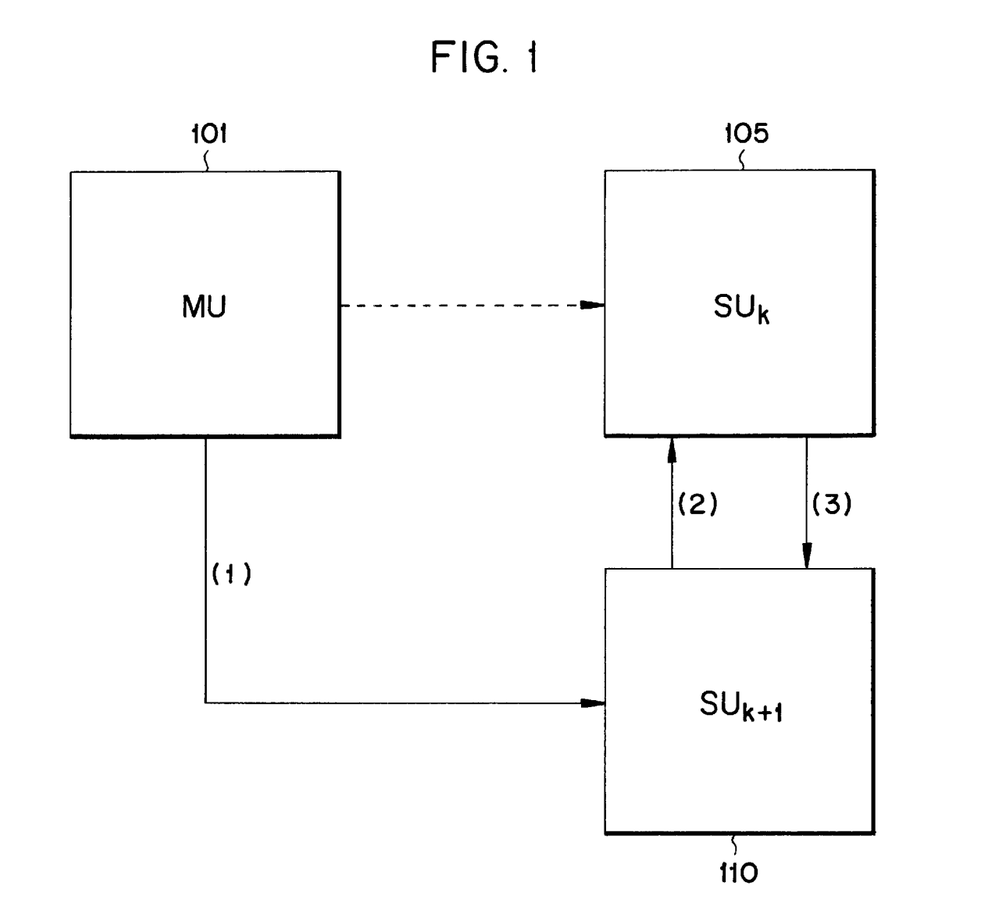
FIG. 1 illustrates a first exemplary embodiment of the present invention.

FIG. 1 illustrates one such technique herein referred to as the direct transfer technique. According to the direct transfer technique, a MU 101 undergoes a hand-over from $SU_k$ 105 to $SU_{k+1}$ 110, as illustrated by the directional arrow marked "1". Next, $SU_{k+1}$ 110 contacts $SU_k$ 105 by sending a SA request message, as illustrated by the directional arrow marked "2". The SA request message specifically requests those SAs associated with the MU 101. Accordingly, the SA request message must contain an identifier code for the MU 101. $SU_k$ 105 then replies to the SA request message by sending the appropriate SA attributes to $SU_{k+1}$ 110, as illustrated by the directional arrow marked "3".

In addition to the procedural steps described above, the direct transfer technique illustrated in FIG. 1, might also involve the step of verifying that $SU_k$ belongs to the same administrative domain as $SU_{k+1}$. To accomplish this, each SU associated with the administrative domain might maintain a list containing all IP addresses associated with the administrative domain. $SU_{k+1}$ can then perform the required verification by simply checking to see if the IP address associated with $SU_k$ is on the list. Alternatively, if administrative domain corresponds with an IP network or subnet, $SU_{k+1}$ can simply compare the network identification portion of $SU_k$'s IP address with the network identification portion of it's own IP address. If they match, $SU_{k+1}$ has verified that $SU_k$, in fact, belongs to the same administrative domain. If $SU_{k+1}$ determines that $SU_k$ does not belong to the same administrative domain, then the MU and $SU_{k+1}$ may be required to renegotiate the ISAKMP SA and the $IP_{SEC}$ SAs, unless the attributes associated with the ISAKMP SA and the $IP_{SEC}$ SAs were stored, for example, in a database, as illustrated in FIG. 2, during a previous connection between the MU and any one of the SUs associated with the administrative domain to which $SU_{k+1}$ belongs.

Figure 2:
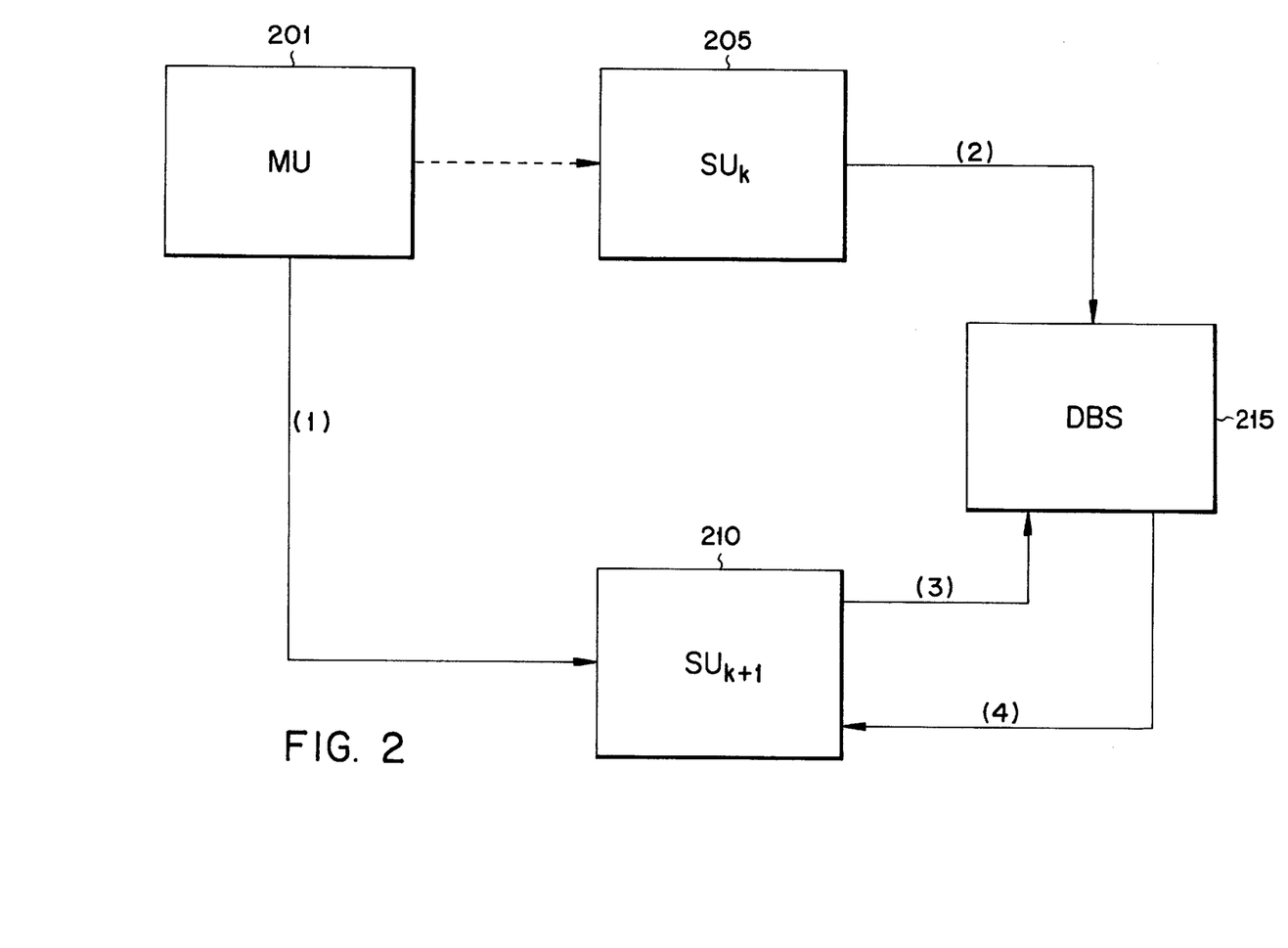
FIG. 2 illustrates a second exemplary embodiment of the present invention.

FIG. 2 illustrates an alternative technique for transferring the appropriate SA attributes. This alternative technique is herein referred to as the intermediate storage technique. The intermediate storage technique may be preferable where the network configuration makes it difficult to identify SUk, or when direct communication between $SU_k$ and $SU_{k+1}$ is difficult or undesirable. In accordance with this alternative technique, as shown in FIG. 2, a MU 201 undergoes a hand-over from $SU_k$ 205 to $SU_{k+1}$ 210, as illustrated by the directional arrow marked "1". Prior to, simultaneous to, or if necessary, subsequent to the hand-over, $SU_k$ transfers the appropriate SAs associated with the MU 201 to a database (DBS) 215, as indicated by the directional arrow marked "2". $SU_{k+1}$ 210 then sends a SA request message to the DBS 215, as illustrated by the directional arrow marked "3". As in the direct transfer technique, the SA request message contains an identifier code that specifically identifies the MU 201. Thus, the DBS 215 can reply to the SA request message by sending the appropriate SAs, associated with the MU 201, to $SU_{k+1}$ 210, as illustrated by the directional arrow marked "4".

As one skilled in the art will readily appropriate, the SAs contain sensitive information (e.g., session keys). Accordingly, the SA information that is transferred from $SU_k$ to $SU_{k+1}$, using the direct transfer or the intermediate storage technique, should be protected. Therefore, encryption and authentication mechanisms might be employed to ensure confidentiality and authenticity for this information.

Figure 3:
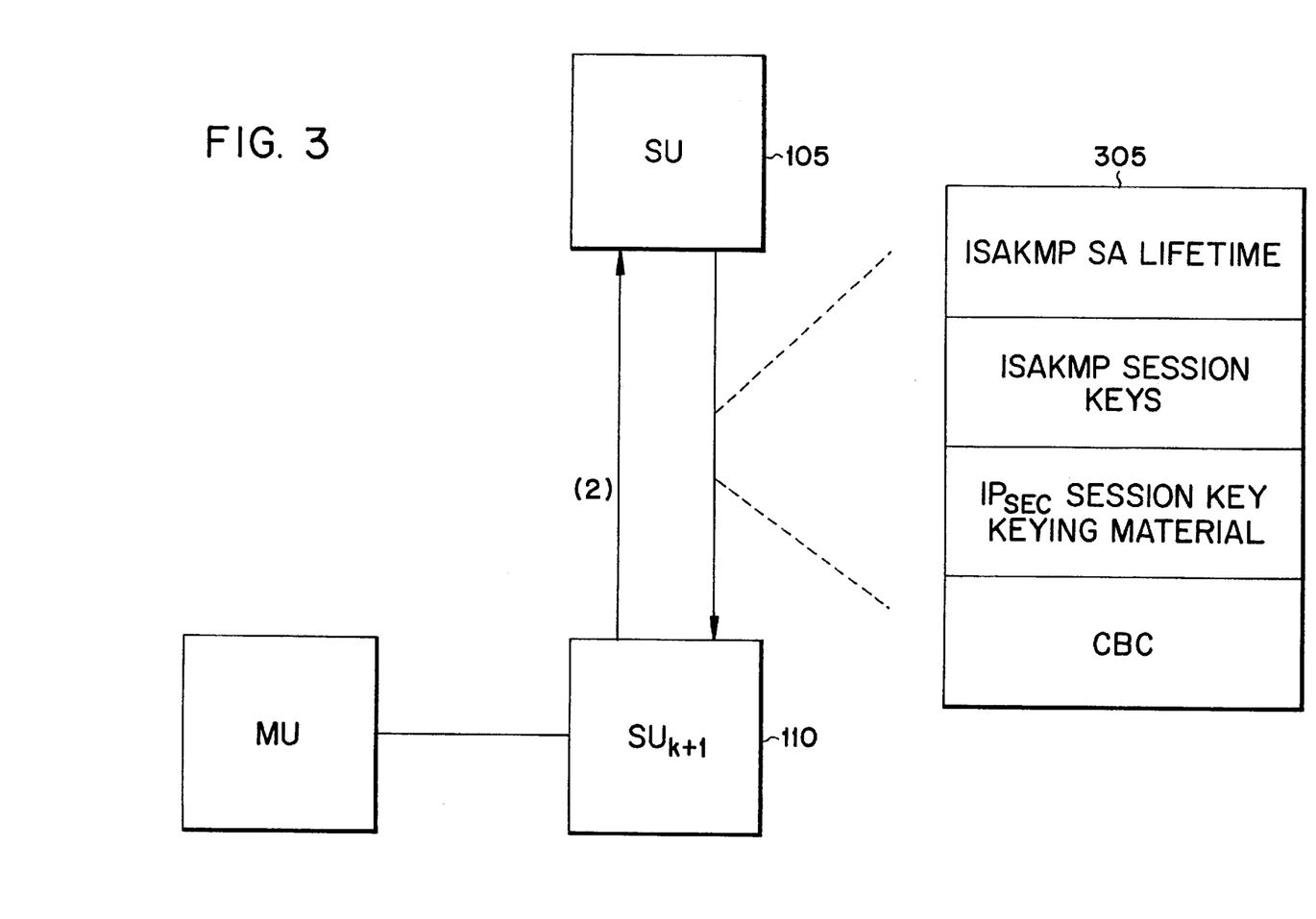
FIG. 3 illustrates a first exemplary set of security association attributes being transferred in accordance with the present invention.

FIG. 3 illustrates, more specifically, the SA attributes that might be transferred from $SU_k$ to $SU_{k+1}$, if the partial SA reuse embodiment is employed. As illustrated, $SU_k$ 105, upon receiving a SA request message from $SU_{k+1}$ 110, as indicated by the directional arrow marked "2", sends a reply message 305 to $SU_{k+1}$ 110, wherein the reply message 305 contains the information necessary to define the following ISAKMP SA attributes: the ISAKMP SA lifetime; the ISAKMP session keys, including the ISAKMP session key for authentication and the ISAKMP session key for encryption; keying material, which is required for deriving the $IP_{SEC}$ session keys; the last IKE phase 1 CBC (i.e., cipher block chaining) output block for generating an initialization vector which, in turn, is needed for the encryption of the first IKE phase 2 message. Although FIG. 3 indicates that the SA attributes are being transferred in accordance with the direct transfer technique described above, it will be readily apparent to one skilled in the art that the intermediate storage technique may be employed in the alternative.

Figure 4:
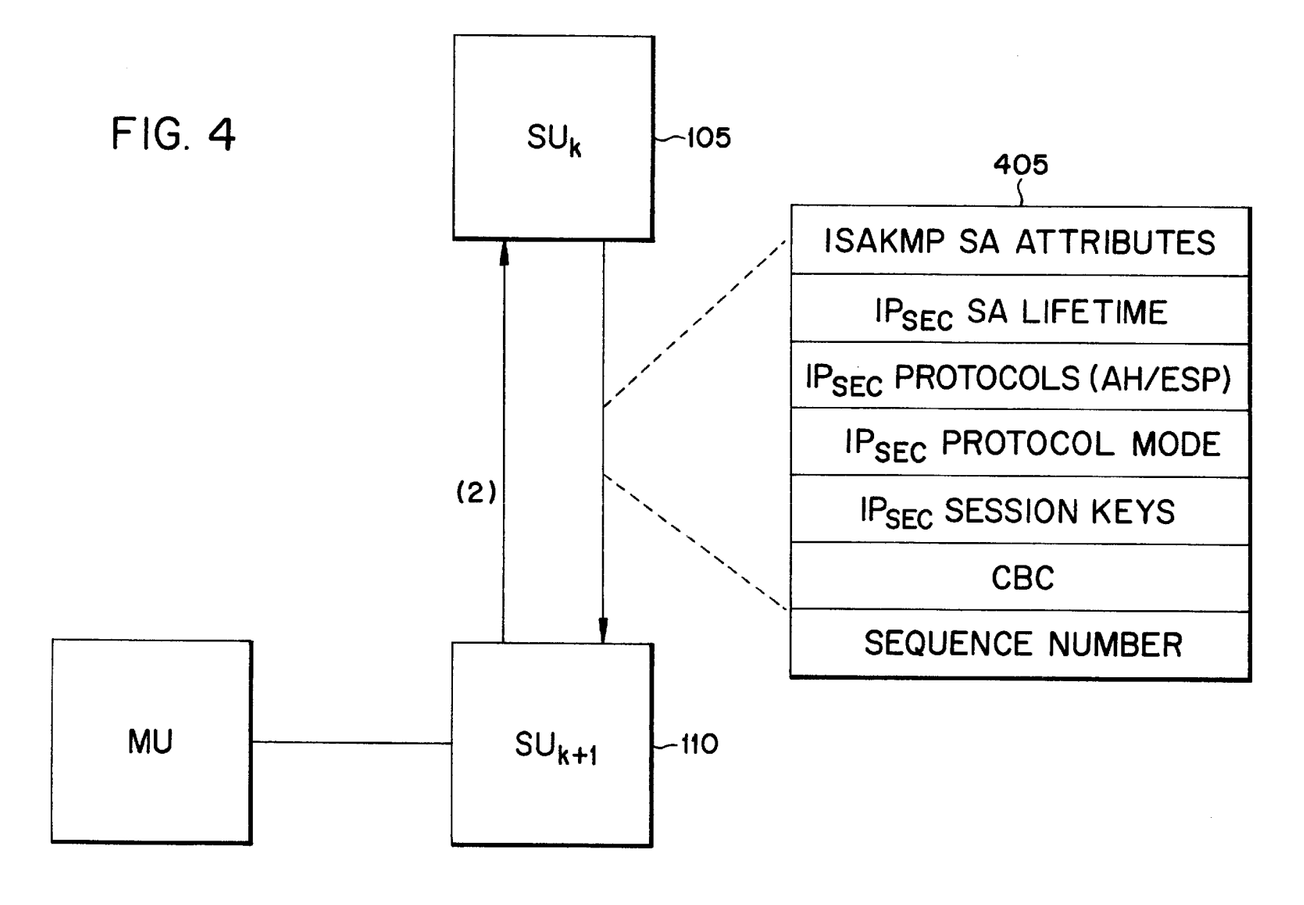
FIG. 4 illustrates a second set of security association attributes being transferred in accordance with the present invention.

FIG. 4 illustrates the SA attributes that might be transferred from $SU_k$ 105 to $SU_{k+1}$ 110, in addition to the SA attributes identified in FIG. 3, if the full SA reuse embodiment is employed. As illustrated in FIG. 4, $SU_k$ 105, upon receiving a SA request message from $SU_{k+1}$ 110, as indicated by the directional arrow marked "2" sends a reply message 405 to $SU_{k+1}$ 110, wherein the reply message 405 contains the information necessary to define the ISAKMP SA attributes identified above in FIG. 3, and the information necessary to define the following $IP_{SEC}$ SA attributes: the $IP_{SEC}$ SA lifetime; the $IP_{SEC}$ protocols being used, that is, the authentication header and/or encapsulating security payload protocols; the $IP_{SEC}$ protocol mode, that is, the transport mode or the tunnel mode; the security parameter index(es); the $IP_{SEC}$ session keys, including the session keys for authentication and encryption, as well as their respective algorithms; the last CBC output block prior to hand-over, which is used as the initialization vector for encryption of the first IP packet subsequent to hand-over; and the value of the sequence number, in accordance with the authentication header protocol or the encapsulating security payload protocol, just prior to hand-over, as this value plus 1 will be the initial value of the sequence number after hand-over for anti-relay checking purposes. As was the case in FIG. 3, the transfer of SA attributes in FIG. 4 is accomplished in accordance with the direct transfer technique described above. However, it will be understood that the SA attributes may be transferred in accordance with the intermediate storage technique, also described above.

As stated previously, the first time a MU connects to any SU in a given administrative domain, an IKE phase 1 negotiation and an IKE phase 2 negotiation must be accomplished, thereby establishing the ISAKMP SA and the $IP_{SEC}$ SAs respectively. However, in accordance with another aspect of the present invention, the SA attributes associated with the ISAKMP SA and the $IP_{SEC}$ SAs may be stored for a period of time, for example, a period of time equivalent to the ISAKMP SA lifetime and the $IP_{SEC}$ SA lifetime respectively. The SA attributes might be stored in a database, such as the database 215 illustrated in FIG. 2. By storing the SA attributes, the MU might avoid having to renegotiate the ISAKMP SA and the $IP_{SEC}$ SAs if the MU becomes disassociated with the administrative domain, for example, by being handed-over to a SU which is not associated with the administrative domain, and then the MU becomes reassociated with the administrative domain, for example, by being handed back-over to a SU associated with the administrative domain, before the aforementioned period of time expires. In accordance with this aspect of the invention, the transfer of SA attributes to $SU_{k+1}$ might be accomplished in much the same way as the intermediate storage technique illustrated in FIG. 2, but for the fact that the MU is handed-over to a SU associated with another administrative domain during an interim period between the time the MU is connected to $SU_k$ and the time the MU is connected to $SU_{k+1}$.

Figure 5:
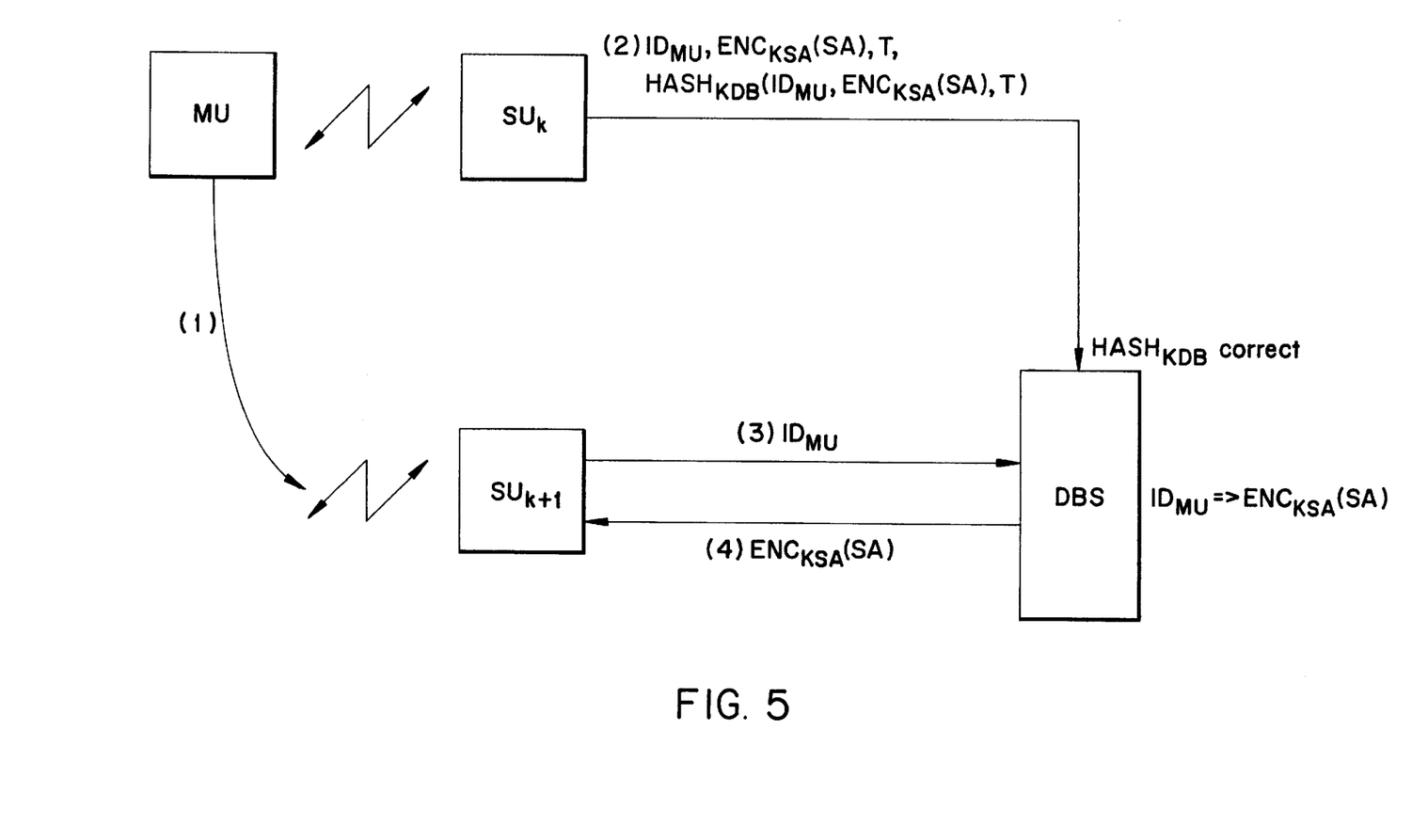
FIG. 5 illustrates the transfer of security association attribute information, in accordance with the present invention, using encryption and authentication techniques.

FIG. 5 illustrates a procedure for transferring SA attribute control messages, in accordance with an exemplary embodiment of the present invention, using encryption and authentication techniques to protect the SA attributes during transfer. While the procedure illustrated in FIG. 5 involves the intermediate storage technique, described above with reference to FIG. 2, one skilled in the art will readily appreciate that a similar procedure could be applied to the direct transfer technique, described above with reference to FIG. 1.

The procedure illustrated in FIG. 5 initially begins with the MU undergoing a hand-over procedure from the stationary unit SUk to the stationary unit $SU_{k+1}$, as indicated by the directional arrow marked "1", wherein $SU_k$ and $SU_{k+1}$ are associated with the same administrative domain. Therefore, SUk and $SU_{k+1}$ are subject to the same security policy. Then, at some point during the hand-over procedure, $SU_k$ transfers the SA attribute control message to the DBS, as indicated by the directional arrow marked "2". As shown, the SA attribute control message contains a MU identification code ($ID_{MU}$); the SA attributes ($ENC_{KSA}$), which are encrypted using an encryption key $K_{SA}$; a time stamp (T); and a Hash value ($HASH_{KDB}$). The purpose of the MU identification code ($ID_{MU}$) is to identify the SA attributes (i.e., $ENC_{KSA}$) as being associated with the MU. The purpose of the time stamp (T) is inform the DBS as to the period of time that has elapsed since the $SU_K$ sent the SA control message. If a significant period of time has elapsed, the DBS may be designed to reject the SA attribute control message to protect against unauthorized replay. While the MU identification code a ($ID_{MU}$) and the time stamp (T) are not typically encrypted, the SA attributes are encrypted using an encryption key KSA, which is shared by each of the SUs associated with the administrative domain. The Hash value ($HASH_{KDB}$) is used for authentication purposes, and it is derived using an authentication key $K_{DB}$ and as a function of the MU identification code ($ID_{MU}$), the SA attributes ($ENC_{KSA}$) and the time stamp (T). The authentication key $K_{DB}$, like the encryption key $K_{SA}$, is shared by each of the SUs associated with the administrative domain. In addition, it is shared by the DBS.

As stated, $SU_k$ transfers the SA attribute control message, containing the MU identification code ($ID_{MU}$), the encrypted SA attributes ($ENC_{KSA}$), the time stamp (T), and the Hash value ($HASH_{KDB}$), to the DBS. Upon receiving the SA attribute control message, the DBS recalculates the Hash value as a function of the received values for the MU identification code ($ID_{MU}$), the SA attributes ($ENC_{KSA}$), and the time stamp (T), and based on the authentication key $K_{DB}$. Then DBS then compares the recalculated Hash value with the received Hash value. If the two values are equal (i.e., if the two values match), the DBS authenticates $SU_k$, and accepts the SA attribute control message. The DBS then stores the encrypted SA attributes ($ENC_{SKA}$) along with the MU identification code ($ID_{MU}$).

Further in accordance with the procedure illustrated in FIG. 5, $SU_{k+1}$ now issues a SA attribute request message to the DBS, as indicated by the directional arrow marked "3", wherein the SA attribute request message contains the MU identification code ($ID_{MU}$). In response, the DBS transfers to $SU_{k+1}$ the encrypted SA attributes ($ENC_{KSA}$) that correspond to the MU identification code ($ID_{MU}$) contained in the SA attribute request message. By applying the encryption key $K_{SA}$ to the SA attributes ($ENC_{KSA}$), $SU_{k+1}$ can decipher the encrypted SA attributes.

The present invention has been described with reference to a preferred embodiment. However, it will be readily apparent to those skilled in the art that it is possible to embody the invention in specific forms other than as described above without departing from the spirit of the invention. The preferred embodiments are illustrative and should not be considered restrictive in any way. The scope of the invention is given by the appended claims, rather than the preceding description, and all variations and equivalents which fall within the range of the claims are intended to be embraced therein.

What is claimed is:

1. In a radio telecommunication system, a method for accomplishing hand-over of a mobile unit from a first stationary unit to a second stationary unit, said method comprising the steps of:

disconnecting the mobile unit from the first stationary unit;

connecting the mobile unit to the second stationary unit; and reusing an existing security association to support the connection between the mobile unit and the second stationary unit, wherein the existing security association was previously used to support the connection between the mobile unit and the first stationary unit.

2. The method of claim 1 further comprising the step of:

transferring a number of security association attributes, associated with the security association, from the first stationary unit to the second stationary unit.

3. The method of claim 2, wherein the security association attributes are transferred from the first stationary unit directly to the second stationary unit.

4. The method of claim 2, wherein said step of transferring the number of security association attributes, associated with the security association, from the first stationary unit to the second stationary unit comprises the steps of:

transferring the number of security association attributes from the first stationary unit to a data storage entity; and transferring the number of security association attributes from the data storage entity to the second stationary unit.

5. The method of claim 4, wherein the data storage entity is a database accessible to the second stationary unit.

6. The method of claim 2 further comprising the step of:

encrypting the number of security association attributes, prior to the step of transferring the number of security association attributes from the first stationary unit to the second stationary unit, using an encryption key that is shared by the first and the second stationary units.

7. The method of claim 1, wherein the existing security association is an ISAKMP security association.

8. The method of claim 1, wherein the existing security association is an $IP_{SEC}$ security association.

9. The method of claim 1, wherein the first stationary unit and the second stationary unit are both associated with a common administrative domain, such that the first stationary unit and the second stationary unit are subject to a common security policy.

10. The method of claim 9, wherein the first stationary unit and the second stationary unit share a common IP address.

11. In a radio telecommunication system, a method for accomplishing hand-over of a mobile unit from a first stationary unit to a second stationary unit, said method comprising the steps of:

disconnecting the mobile unit from the first stationary unit;

connecting the mobile unit to the second mobile unit; and reusing an existing security association to support the connection between the mobile unit and the second stationary unit, wherein the existing security association was previously used to ensure secure communications for a connection between the mobile unit and a third stationary unit, and wherein the third stationary unit and the second stationary unit are associated with a first administrative domain that employs a common security policy.

12. The method of claim 11 further comprising the step of:

transferring a set of security association attributes associated with the existing security association from the third stationary unit to the second stationary unit.

13. The method of claim 11, wherein said step of transferring the set of security association attributes associated with the existing security association from the third stationary unit to the second stationary unit comprises the steps of:

transferring the security association attributes from the third stationary unit to a storage location; and transferring the security association attributes from the storage location to the second stationary unit.

14. The method of claim 13, wherein the storage location is in a database associated with the first administrative domain to which the third stationary unit and the second stationary unit belong.

15. The method of claim 11, wherein the first stationary unit is associated with a second administrative domain.

16. In a radio telecommunication network, a method for reusing security associations to facilitate hand-over of a mobile unit between stationary units that are associated with a common administrative domain, wherein all of the stationary units associated with the common administrative domain are subject to the same security policy, said method comprising the steps of:

negotiating a first security association for a connection between the mobile unit and a first stationary unit associated with the common administrative domain;

disconnecting the mobile unit from the first stationary unit;

connecting the mobile unit to a second stationary unit associated with the common administrative domain;

transferring a first set of security association attributes, corresponding to the first security association, from the first stationary unit to the second stationary unit; and employing the first security association to ensure secure communications for the connection between the mobile unit and the second stationary unit.

17. The method of claim 16, wherein said step of negotiating a first security association comprises the step of:

establishing an ISAKMP security association in accordance with an IKE phase 1 negotiation procedure.

18. The method of claim 17 further comprising the steps of:

negotiating a second security association, in accordance with an IKE phase 2 negotiation procedure, for the connection between the mobile unit and the first stationary unit;

transferring a second set of security association attributes, corresponding to the second security association, from the first stationary unit to the second stationary unit; and employing the second security association, in conjunction with the first security association, to further ensure secure communications for the connection between the mobile unit and the second stationary unit.

19. The method of claim 18, wherein the second security association is an $IP_{SEC}$ authentication header protocol security association.

20. The method of claim 18, wherein the second security association is an $IP_{SEC}$ encapsulating security payload protocol security association.

21. In a radio telecommunication system, an apparatus for accomplishing hand-over of a mobile unit from a first stationary unit to a second stationary unit, said apparatus comprising:

means for disconnecting the mobile unit from the first stationary unit;

means for connecting the mobile unit to the second stationary unit; and means for reusing an existing security association to support the connection between the mobile unit and the second stationary unit, wherein the existing security association was previously used to support the connection between the mobile unit and the first stationary unit.

22. The apparatus of claim 21 further comprising:

means for transferring a number of security association attributes associated with the security association from the first stationary unit to the second stationary unit.

23. The apparatus of claim 22, wherein the security association attributes are transferred from the first stationary unit directly to the second stationary unit.

24. The apparatus of claim 22, wherein said means for transferring the number of security association attributes associated with the security association from the first stationary unit to the second stationary unit comprises:

means for transferring the number of security association attributes from the first stationary unit to a data storage entity; and means for transferring the number of security association attributes from the data storage entity to the second stationary unit.

25. The apparatus of claim 24, wherein the data storage entity is a database accessible to the second stationary unit.

26. The apparatus of claim 22 further comprising:

means for encrypting the number of security association attributes, prior to transferring the number of security association attributes from the first stationary unit to the second stationary unit, wherein said means for encrypting the number of security association attributes employs an encryption key that is shared by the first and the second stationary units.

27. The apparatus of claim 21, wherein the existing security association is an ISAKMP security association.

28. The apparatus of claim 21, wherein the existing security association is an $IP_{SEC}$ security association.

29. The apparatus of claim 21, wherein the first stationary unit and the second stationary unit are both associated with a common administrative domain, such that the first stationary unit and the second stationary unit are subject to a common security policy.

30. The apparatus of claim 29, wherein the first stationary unit and the second stationary unit share a common IP address.

31. In a radio telecommunication system, an apparatus for accomplishing handover of a mobile unit from a first stationary unit to a second stationary unit, said apparatus comprising:

means for disconnecting the mobile unit from the first stationary unit;

means for connecting the mobile unit to the second mobile unit; and means for reusing an existing security association to support the connection between the mobile unit and the second stationary unit, wherein the existing security association was previously used to ensure secure communications for a connection between the mobile unit and a third stationary unit, and wherein the third stationary unit and the second stationary unit are associated with a first administrative domain that employs a common security policy.

32. The apparatus of claim 31 further comprising:

means for transferring a set of security association attributes associated with the existing security association from the third stationary unit to the second stationary unit.

33. The apparatus of claim 31, wherein said means for transferring the set of security association attributes associated with the existing security association from the third stationary unit to the second stationary unit comprises:

means for transferring the security association attributes from the third stationary unit to a storage location; and means for transferring the security association attributes from the storage location to the second stationary unit.

34. The apparatus of claim 33, wherein the storage location is in a database associated with the first administrative domain to which the third stationary unit and the second stationary unit belong.

35. The apparatus of claim 31, wherein the first stationary unit is associated with a second administrative domain.

* * * * *